Feb. 23, 1960    A. KENNAWAY ET AL    2,925,983
PULSE GENERATOR WEIGHER
Filed Feb. 13, 1953    7 Sheets-Sheet 1
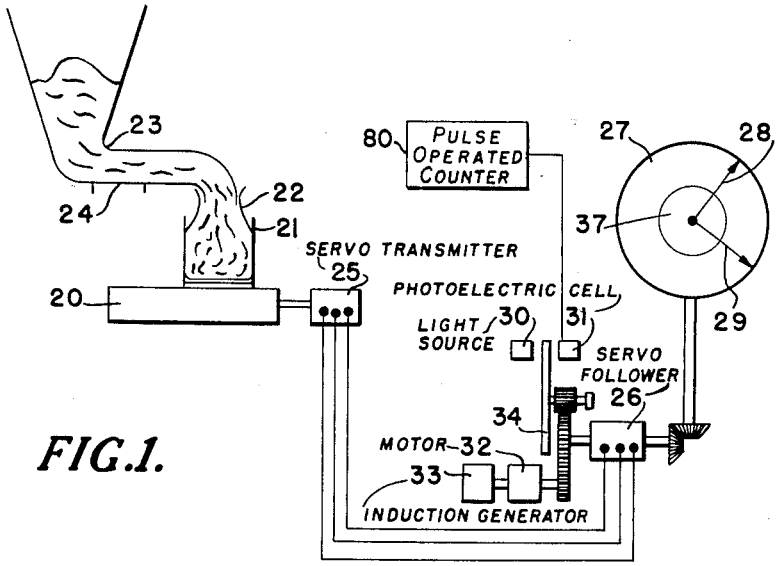
FIG.1.
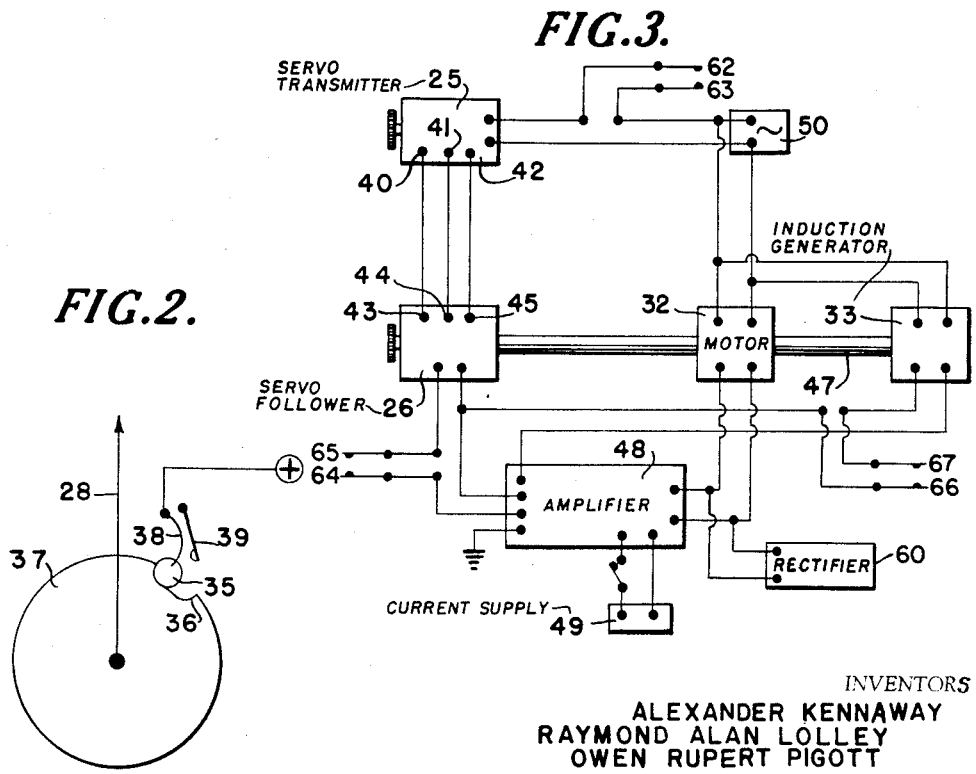
FIG.2.
FIG.3.
INVENTORS
ALEXANDER KENNAWAY
RAYMOND ALAN LOLLEY
OWEN RUPERT PIGOTT
BY
Cushman, Darby & Cushman
ATTORNEYS

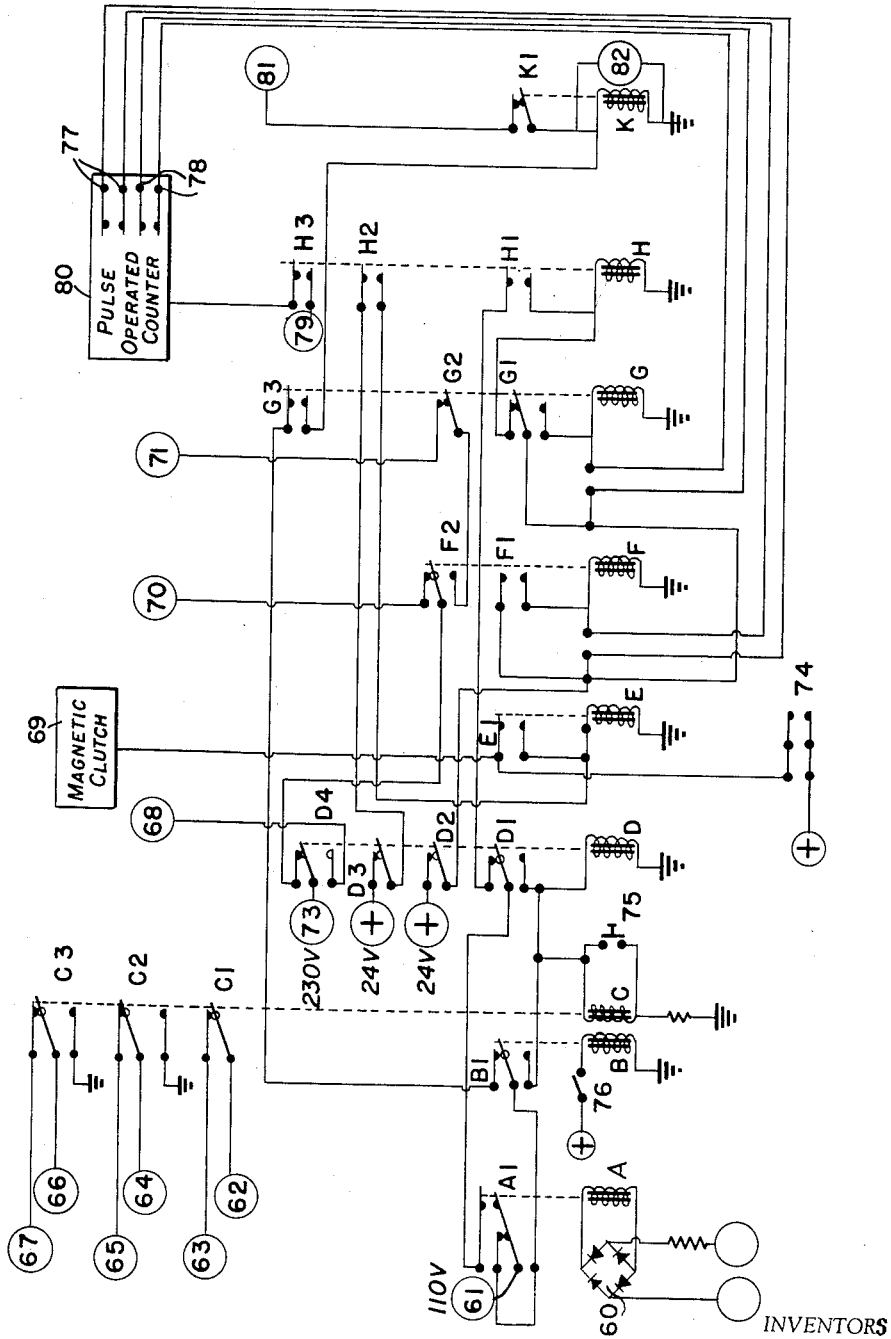

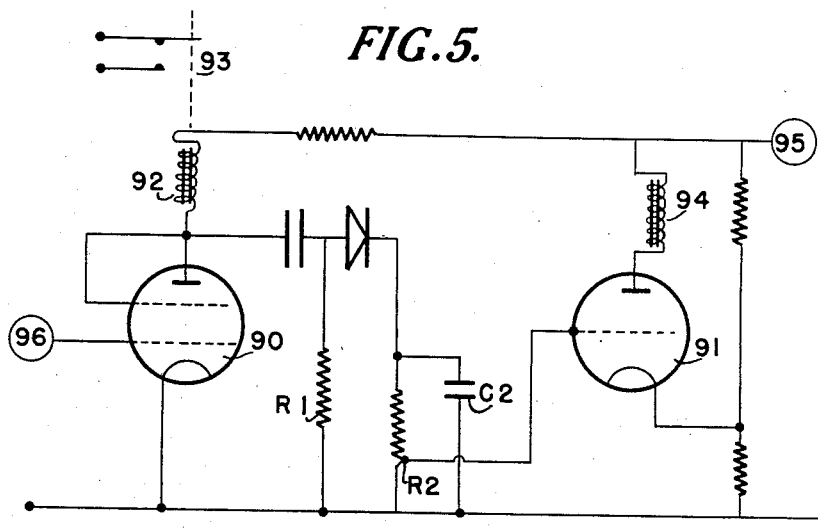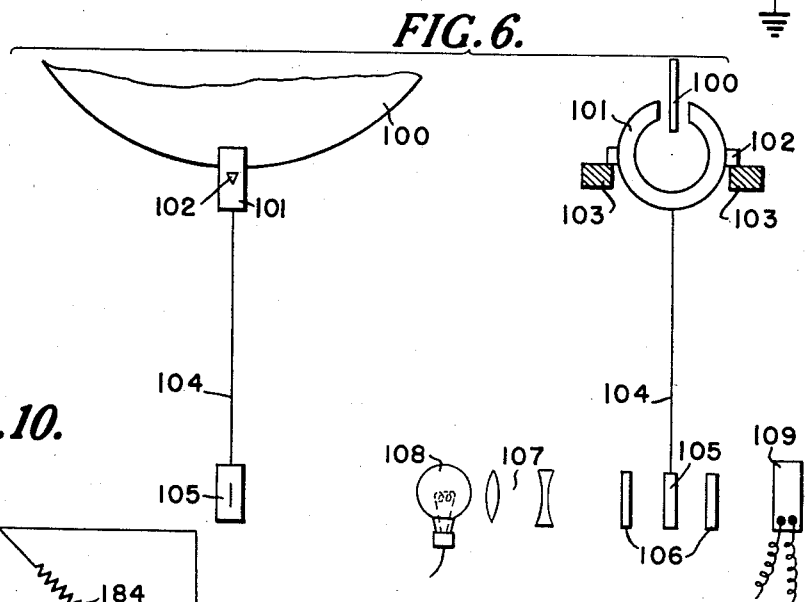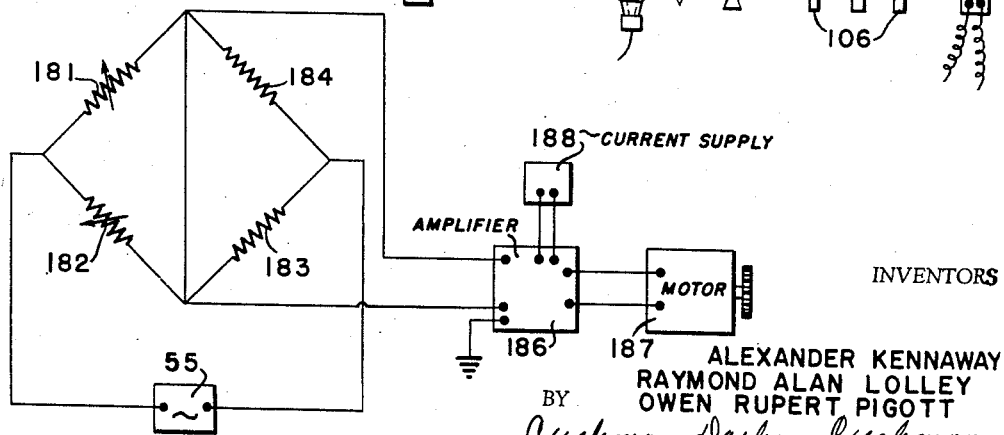

Feb. 23, 1960                A. KENNAWAY ET AL                2,925,983
                            PULSE GENERATOR WEIGHER
Filed Feb. 13, 1953                                       7 Sheets-Sheet 4

INVENTORS
ALEXANDER KENNAWAY
RAYMOND ALAN LOLLEY
OWEN RUPERT PIGOTT

Cushman, Darby & Cushman
ATTORNEYS

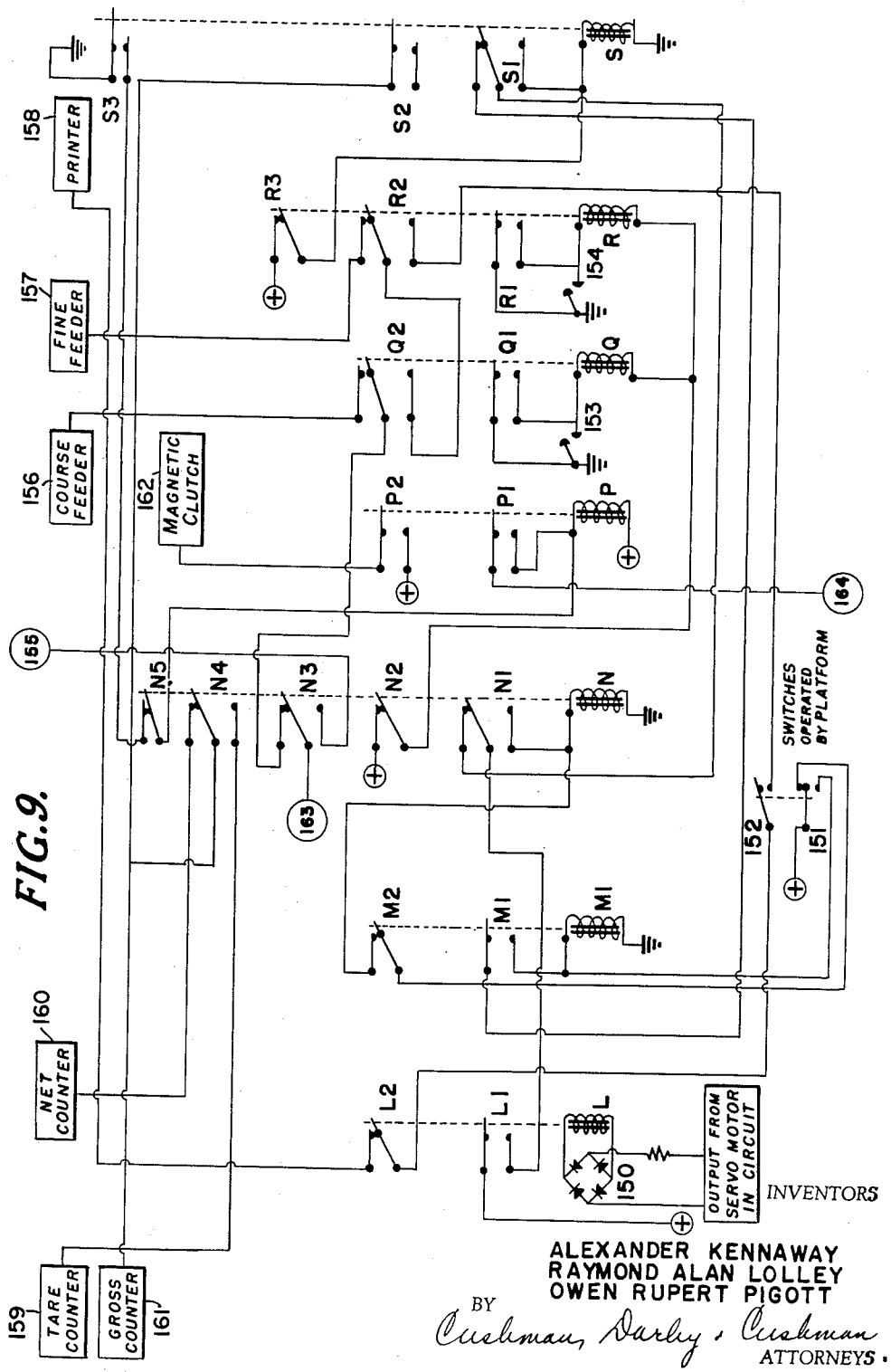

FIG. 11.ᵃ
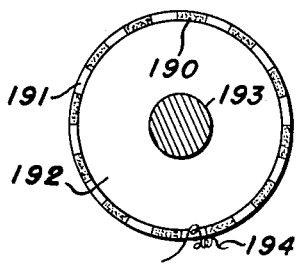
FIG. 11.ᵇ
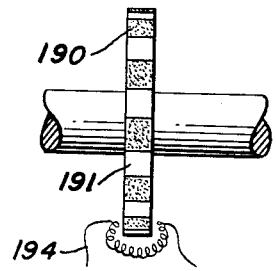
FIG. 12.ᵃ
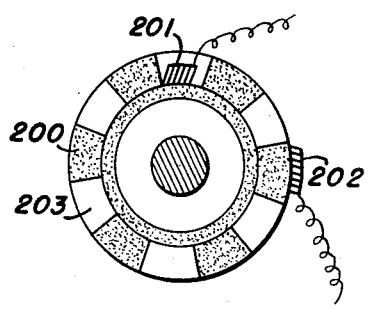
FIG. 12.ᵇ
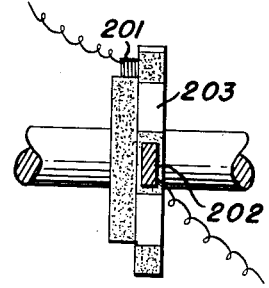
FIG. 13.ᵃ
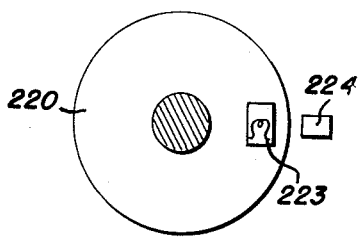
FIG. 13.ᵇ
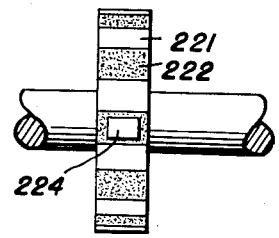
INVENTORS
ALEXANDER KENNAWAY
RAYMOND ALAN LOLLEY
OWEN RUPERT PIGOTT
BY Cushman, Darby & Cushman
ATTORNEYS Feb. 23, 1960   A. KENNAWAY ET AL   2,925,983
PULSE GENERATOR WEIGHER
Filed Feb. 13, 1953   7 Sheets-Sheet 7

INVENTORS
ALEXANDER KENNAWAY
RAYMOND ALAN LOLLEY
OWEN RUPERT PIGOTT
BY
Cushman, Darby & Cushman
ATTORNEYS

United States Patent Office 2,925,983
Patented Feb. 23, 1960

2,925,983

PULSE GENERATOR WEIGHER

Alexander Kennaway, London, Raymond Alan Lolley, St. Albans, and Owen Rupert Pigott, Tewin Wood, England, assignors to Imperial Chemical Industries Limited, London, England, a corporation of Great Britain Application February 13, 1953, Serial No. 336,848

Claims priority, application Great Britain December 8, 1952

13 Claims. (Cl. 249—2)

This invention relates to weighing equipment designed for use where material is automatically fed directly into a container to give a desired net weight.

In weighing operations an article carrying unit, e.g. a hook, pan or platform (hereinafter referred to as a platform for convenience) is depressed against a counteracting force, and the movement of this unit causes a determinate movement in, for example, a shaft. This movement actuates a weight determining means which may be a pointer and scale, the movement of the former relative to the latter indicating the weight on the platform, or a counter which indicates the weight on the platform or when a particular weight is involved as when an automatic feeder is used, a movement from one point to another, e.g. the movement of the end of a pointer from its zero position to a prearranged point in its circular path.

Where material is automatically weighed into a container it is necessary first to tare the container accurately, and then to provide a means for stopping the automatic feeder when the desired net weight has been fed. Containers may be tared, for example, by weighing the empty container, adjusting the weight indicating means by returning the pointer to zero by hand, and then feeding in the desired net weight of material. The filled container is then removed from the weighing equipment and the pointer re-adjusted to give a true zero. The amount of material automatically fed in may be controlled by arranging that the pointer brushes a suitably placed contact and thereby closes a circuit which stops the action of the feeder. In such a weighing machine, it follows that the accuracy of the final weighing depends upon the accuracy with which the operator adjusts the zero of his machine at each weighing. The inaccuracies which are introduced by this re-adjustment may be tolerated when the material being weighed out is relatively cheap, but when the material being weighed out is relatively expensive, or if many repetitive weighings are involved, then a method of taring which is independent of the ability of the operator to re-adjust the machine is desirable. Also in such a weighing machine, the pointer in addition to fulfilling its normal function of indicating weights is made to control the action of the automatic feeder. It is normally preferred that the pointer should have the sole function of indicating the weight carried by the weighing machine.

According to the present invention we provide an improved weighing equipment, for measuring the net weight of material in containers, in which a weight measuring means may be brought into operating condition when equilibrium has been reached in the weighing equipment when an article carrying unit carries a container, said weight measuring means comprising a counting unit and means for generating electric impulses which may be fed into the counting unit, the number of said electric impulses being proportional to the weight of material fed into the container, and said weighing equipment comprising an automatic feeding means which may be brought into operation when said equilibrium has been reached, the operation of said feeding means being automatically stopped when a desired net weight of material has been fed, by an electric means which is arranged to be actuated by the electric circuit of said counting unit corresponding to said desired net weight. We prefer that the weight measuring means is brought into operating condition by a detecting means which detects said equilibrium, and we further prefer that the detecting means also starts the flow of material into the container. The weight measuring means may be used if desired in combination with a visual weight indicating means, e.g. a pointer moving over a scale, which is brought into operating condition when said equilibrium has been reached, or with a visual weight indicating means which is adjusted by a mechanism which may be actuated by movement of an article carrying unit when a container is carried by it.

Throughout this specification the word "material" includes articles as well as materials such as powders, granules, pellets, lumps, chippings, slurries, pastes, liquids and gases.

Our invention will be described by reference to the attached drawings which illustrate in diagrammatic form various embodiments of our equipment.

Figures 1, 2, 3 and 4 illustrate a weighing machine operated automatically by a remote control which provides a visual indication of the tare, net and gross weights and gives a printed record of the net weight. Figure 1 represents the general layout of the weighing equipment, Figure 2 illustrates the part of the apparatus which returns the net weight pointer to zero, Figure 3 illustrates the circuit which operates the remote indicating and control mechanism, and Figure 4 illustrates the circuit which is used to detect equilibrium in the weighing equipment, and which controls the action of the automatic feeder and the printing mechanism.

Figures 5, 6, 7 and 8 illustrate electronic, magnetic, hydraulic and pneumatic means, respectively, by which equilibrium may be automatically detected in weighing equipment;

Figure 9 is a circuit diagram of means adapted for use in combination with the embodiment of Figure 1 to provide a printed record of net, tare and gross weights, and a visual indication of these weights;

Figure 10 is a circuit diagram of means adapted to operate a visual indicating means, and to provide automatic detection of equilibrium;

Figures 11a and 11b are elevational views of means for generating electric pulses by a magnetic tape and a conductor;

Figures 12a and 12b are elevational views of armature means for generating electric pulses, and Figures 13a and 13b are elevational views of photo-electric means for generating electric pulses.

Figure 14:
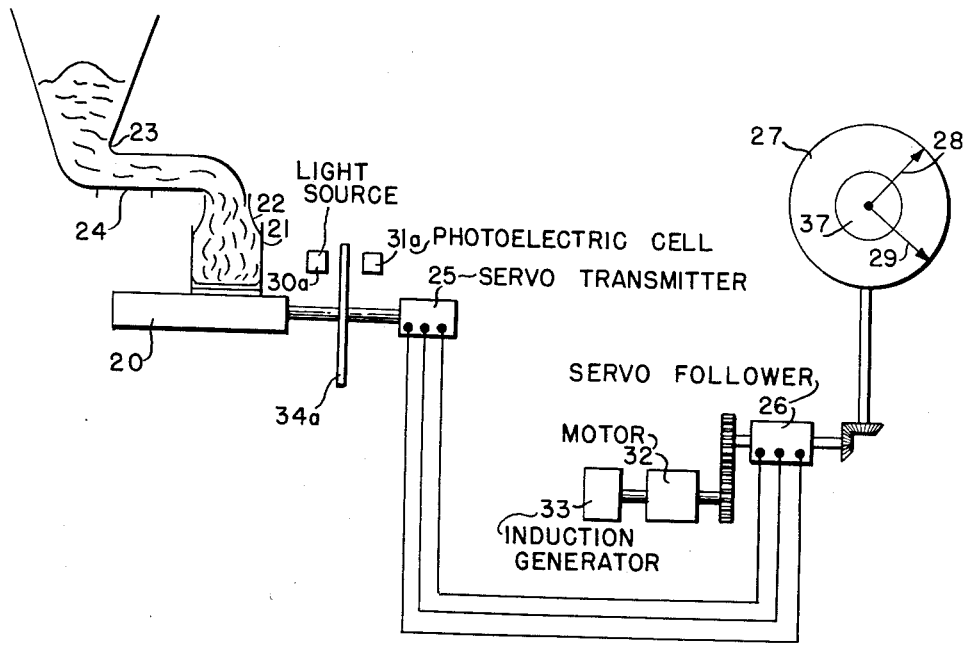
Figure 14 illustrates a modification of the arrangement shown in Figure 1.

In Figure 1, 20 represents the weighing platform having on it a drum 21 containing a partly filled liner 22, the neck of the liner being attached to the outlet of the automatic feed 23. Liners are normally used in weighing out material in drums when there is a possibility of the material fed to the drum being contaminated with, for example, particles of paint or rust or chips of wood (depending on the nature of the drum), or where it is desired to prevent the material fed into the drum absorbing moisture from the atmosphere. Liners may be made, for example, from strong paper, or synthetic plastic film, e.g. polyethylene film. The automatic feeder which is of known type, has a vibrating table 24 which is operated hydraulically and can be made to give a fast or slow feed. The movement of the weighing machine platform is communicated to the remote control by a servomotor system as hereinafter described, the transmitter being shown at 25 and the follower at 26. The remote control comprises the scale 27 carrying two pointers 28 and 29. Pointer 28 has attached to it a disc 37 which is made of a light metal, e.g. aluminum; the purpose of this disc is described hereinafter. The disc may if desired be made of a non conducting material, e.g. a synthetic resinous material. Pointer 29 moves continuously during a weighing operation, but pointer 28 is brought into action by a magnetic clutch only after the empty container has been tared. The servomotor system is of the kind hereinafter described having a driving motor 32 and an induction generator 33. The follower 26 is connected through gears to the disc 34 which has alternate transparent and opaque areas round its edge which pass when the disc rotates between the light source 30 and the photoelectric cell 31. The effect of the disc when it rotates is to interrupt the beam of light to the photoelectric cell and thereby provide a source of electric impulses. Alternatively, 34, 30 and 31 may be placed in the positions shown in 34a, 30a and 31a, in the modified arrangement illustrated in Figure 14. Since the rotation of the disc 34 will be proportional to the weight carried by the platform 20, the number of electric impulses will be a measure of the weight which causes the disc to rotate. The impulses are fed into the pulse generated counter 80. Figure 1 indicates the circuit connecting the two servomotors, the remainder of the servomotor circuit being similar to that illustrated in Figure 3.

Figure 3 illustrates a servomotor system which may be used to operate the remote control mechanism and to provide the means by which equilibrium may be detected in the weighing equipment. The transmitter 25 and the follower 26 are each three phase motors, the stator windings being connected across the terminals 40, 41, 42, 43, 44 and 45 as shown. The rotor winding of the transmitter 25 is connected to the source of alternating current 50. The rotor of the transmitter 25 is connected to a shaft which is caused to rotate when the weighing platform is lowered or raised, that is when the weighing equipment is not in equilibrium. The rotor of the follower 26 is connected directly by means of the shaft 46 to the rotor of the driving motor 32 which is in turn connected directly to the rotor of the induction generator 33 by means of the shaft 47. The rotor winding of the follower 26 is connected to the input side of the amplifier 48 and so also to that of the induction generator. The output side of the amplifier is connected to the driving motor, and the amplifier is also supplied with current from the source 49. The pairs of contacts 62, 63; 64, 65; and 66, 67 are closed for normal operation. The operation of these contacts is illustrated in Figure 4 and described in the description of that figure. When the circuits are closed and the rotors of the transmitter and follower are coincident and the system is at rest, no current flows into the amplifier; when the rotors are not coincident or at rest, current flows into the amplifier, and the amplified current flows into the driving motor which then operates to cause the rotor of the follower to move into coincidence with the rotor of the transmitter. The purpose of the induction generator is to have a damping effect upon the movement of the rotor of the follower by providing a damping current to the amplifier. Thus when the transmitter is caused turn by the effect of a weight on the weighing platform, the follower is caused to turn, and by means of suitable gearing gives a visual indication of the weight by the movement of pointer 29 on scale 27.

In operation, a container is placed on the weighing platform and its tare weight is indicated by pointer 29. When equilibrium is established the automatic feeder starts to operate and pointer 28 is held in by a magnetic clutch and gives a visual indication of the net weight. The method by which the weight measuring means is controlled is illustrated in Figure 4. Also when the feeder starts the electric impulses generated by the photoelectric cell are fed into the counter. The counter comprises banks of counting relays, each relay being of the changeover type, and as each impulse is fed into the counter it causes a change in the arrangement of the relays so that for a particular number of impulses the corresponding arrangement of relays is unique. The feeder is first made to change from a rapid feed to a slow feed at a particular weight by arranging that all the relay contacts which are made in the arrangement corresponding to that weight, form a series circuit which is closed by the making of those contacts. This series circuit forms part of the circuit which controls the operation of the feeder in a known manner; the counter is in effect inserted in the normal control circuit for the feeder, and serves to keep that circuit open until the predetermined weight has been fed, and then with the making of the series circuit in the counter, closes the circuit controlling the feeder. Since for any particular number of impulses each relay must be in one of its two possible positions, i.e. the moving contacts must be against one of the two fixed contacts, all the relays are used to trace the circuit which is closed when the particular number of impulses have been fed. The circuit is traced by connecting the incoming lead to the appropriate fixed contact of the first relay, the terminal of the moving contact of the first relay to the appropriate fixed contact of the second relay, the terminal of the moving contact of the second relay to the appropriate fixed contact of the third relay, and so on. For example, in a bank of four relays the positions of each relay may be regarded as either up or down, the up position being represented by the digit 0 and the down position by the digit 1. The positions of the relays corresponding to the digits 0 to 9 in the denary systetm, i.e. corresponding to from 0 impulses to 9 impulses, may be arranged according to a binary system of notation using the digits 0 and 1. Thus 0 (denary) is indicated when the relays are all in the up position, i.e. 0000 (binary), 1 (denary) is represented by 0001 (binary), 2 (denary) is represented by 0010 (binary), and so on up to 9 (denary) which is represented by 1001, i.e. first and last relays down and the second and third relays up. Other banks of relays are used to provide the tens, hundreds and thousands. In order therefore to effect the change to slow feed at for example 8 lbs., assuming each impulse to represent 1 lb., the circuit for effecting this change is connected through the upper contacts of the first three relays and the lower contact of the fourth relay since 8 (denary) is represented by 1000 (binary). Only when 8 impulses have been fed in will the relays be in this arrangement.

After the feed has changed from fast to slow it is made to stop when the desired net weight has been fed in a manner similar to that described for effecting the change from fast to slow. If for example it is desired to stop the feed when 9 lbs. have been fed, the circuit through the counting relays would be the lower contacts of the 1st and 4th relays and the upper contacts of the 2nd and 3rd relays. Only when 9 impulses have been fed in will the relays be in this arrangement, and the feed will therefore not be automatically stopped until 9 lbs. of material have been fed. When the feeder stops, the circuit is so arranged that the printer operates only when the weighing equipment is in equilibrium, i.e. when the airborne material has reached the container, so that the true net weight is recorded. The counter returns to zero in known manner when the net weight is recorded. The filled drum is removed from the platform and the pointers 28 and 29 return to zero.

Figure 2 illustrates the method by which pointer 28 is returned to zero. Pointer 28 has attached to it a light disc 37 which has a notch 36. A roller 35 is attached to a light spring 38, the other end of the spring being connected to a 24 volt supply of direct current and also being attached to the scale dial 27 so that the roller rides lightly on the periphery of the disc 37. A contact 39 connected to the magnetic clutch circuit is also attached to the scale dial 27 so that when the roller rides on the periphery of the disc the spring 38 and contact 39 touch and the 24 volt supply is fed to the magnetic clutch. The notch is so arranged that when the pointer on its return is at the 1 lb. mark of the scale, the roller drops into the notch and breaks the magnetic clutch circuit and the spring pushes the pointer lightly back to zero against a fixed stop. When the weighing equipment is in equilibrium at tare, the magnetic clutch is brought in by another part of the circuit, and when the pointer reaches the 1 lb. mark the making of contact 39 provides a hold-on, which keeps the magnetic clutch in until the pointer has returned to the 1 lb. mark.

Figure 4 illustrates the circuit by means of which equilibrium is detected in the weighing equipment and the weight measuring means is put into operating condition. In Figure 4, A, B, C, D, E, F, G, H and K are relays operating the nine groups of contacts; A1; B1; C1, C2, C3; D1, D2, D3, D4; E1; F1, F2; G1, G2, G3; H1, H2, H3 and K1 respectively. The contacts A1 are of the type which make before breaking the circuit. These relays are shown in the de-energised condition. Relay C and the press button manual switch 75 are only needed when it is intended to weigh material into a liner supported by a container, the neck of the liner first being attached to the delivery chute from the automatic feeder. Such a procedure may be necessary if the material being fed is of a dusty nature. The circuit is so arranged that when the platform is unloaded and the weighing machine mechanism returns to near its zero position relay C is energised and opens the servomotor circuit. The servomotor circuit is not brought in again until the switch 75 is closed. Switch 75 is of the press button type and returns to the open position when pressure is removed from it. In operating the weighing machine, after removal of a filled container, a fresh container is placed on the platform and the liner adjusted, switch 75 is pressed momentarily, and taring of the container and net weighing will then proceed automatically. If liners are not used, or if there is no need to adjust the liner while the container is on the platform, relay C is not needed and the servomotor circuit is kept closed throughout.

The rectifier 60 has its input terminals connected to the output terminals of the servomotor amplifier. 61 is a 110 volt supply of direct current. The contacts of relay C are connected as follows: 62 and 63 in series through a 50 volt alternating current supply to the input of the servomotor system so that C3 can open or close the servomotor input circuit; 64 and 65 in series to the amplifier input and the output of the follower so that C2 can open or close the input circuit to the amplifier; and 66 and 67 in series to the amplifier input and the induction generator output. These connections are illustrated in Figure 3. The terminal 73 is connected to a 230 volt supply of alternating current which can be fed through D4 to 68 which is a white lamp, or through F2 to the fast feeder 70 which has a red lamp connected in parallel. The 230 volt supply can also be connected through G2 to the slow feed supply 71 which has an amber light connected in parallel. The contact 74 is the contact which is made by the spring operated roller which rides on the disc during net weighing and which when made provides a hold-on for the magnetic clutch 69 which operates the visual indicating pointer (28 in Figure 1). The magnetic clutch has a blue lamp connected in parallel. The switch 76 is operated by the servo mechanism and is closed when there is any weight of about 3 lbs. or less on the platform. This switch may be photoelectrically operated, e.g. by a disc driven by the motor, the disc having a transparent sector which allows a beam of light to fall on a photoelectric cell which gives rise to a current which when amplified closes switch 76.

The transparent sector and the movement of the disc are so arranged that the beam of light passes through the sector whenever a weight of 3 lbs or less is upon the platform, and that the beam of light strikes the opaque part of the disc whenever there is a weight of more than 3 lbs. on the platform. It will be appreciated that this disc will always move an angular distance proportional to the effect of the weight on the platform when the servomotor circuit is closed. The contacts shown at 77 and 78 represent the circuits which are made in the counting relays which effect the change from fast to slow feed and the stopping of the feed respectively. The return of the scaling unit to zero is not shown in Figure 4 since this is a known feature of scaling unit printers and forms no part of the present invention. Contact 79 is connected to the source of electric impulses, that is to the amplifier which amplifies impulses from the photoelectric cell as hereinbefore described. Contact 80 is connected to the counting unit and contact 81 is connected to the printing unit. The printing unit is operated by a momentary current which is passed on at stage 7 of Table I as hereinafter described; no further current passes to the printer at this stage because contact K1 opens at the moment the printer operates. The relay K has a green lamp 82 connected in parallel. All the contacts marked + are connected to a positive 24 volt supply of direct current. It is to be understood that where the 230 volt alternating current supply is fed for example to the coarse feeder, there is an appropriate connection to neutral.

The circuit operates as follows, it being assumed that relay C is omitted and that the servomotor connections are made. The purpose of relay C is to keep the servomotor circuit open until the liner has been adjusted. When the liner has been adjusted switch 75 is closed momentarily, relay C becomes de-energized, the servomotor circuit is closed and net weighing proceeds. Relay C is automatically energized at the completion of the weighing out cycle.

When the platform is empty relay A is not energized because there is no current from the servomotor circuit. Relay B is energized (held in by switch 76 which is closed), D is energized (61 through A1 and B1), and the remaining relays are not energized. The energization of D causes D1 to close the lower contact and thus prepare the circuit for relay D to be held in when A is energized as the platform moves initially and the connection to 61 is changed to the upper contact of A1. Further consequences of the energization of relay D are that D2 and D3 are opened thereby preventing relays E and H from being energized. When an empty drum is put on the platform the servomotor circuit is out of balance and current therefore flows through A, and A1 changes from the position shown in Figure 4. When the pointer has passed the 3 lb. mark switch 76 is open and therefore B is no longer energized. At the same time D remains energized because the contact A1 is a make-before-break contact, and the circuit through A1 and D1 is closed before the lower moving contact of A1 is moved out of contact with the central contact.

At tare equilibrium, the servomotor circuit is in equilibrium and A is no longer energized, D is therefore de-energized because its path to 61 through A1 is opened; D1, D2, D3 and D4 all change to the position shown in Figure 4. The circuit from the positive 24 volt D.C. supply through D2 now passes through G1 to energize H and therefore close the contacts H1, H2 (which causes relay E to be energized since D3 is also closed) and H3. The energization of relays E and H cause the magnetic clutch to be energized, and the closing of the contacts H3 allow any subsequent pulses to be passed to the counter 80. The changing of D4 closes the circuit of the 230 volt A.C. supply to the coarse feeder, and feeding therefore starts. As material is fed, the pulses generated by rotation of disc 34 (see Figure 1) are fed through the closed contacts of H3 to the counter 80 which thus measures the weight of material fed. When the pointer passes the 1 lb. mark the relay that causes the magnetic clutch to be energized is held in by the contacts 74 of the roller operated mechanism.

At the predetermined weight the counter provides a closed circuit that closes the open circuit represented by the contacts 77, and F is energized causing the feed to change from coarse to fine (73 through D4, F2 and G2), while F1 provides a hold-on for F (the circuit represented by the closing of contacts 77 is opened as soon as the weight is increased beyond the predetermined value). At the second predetermined weight, the counter provides a closed circuit that closes the open circuit represented by contacts 78, and relay G is energized thus stopping the current supply to the feeder (G2 open), which therefore stops. Although G1 changes (providing a hold-on for relay G), relay H remains energized because it is held on by H1 through D1 and A1 to 61.

When all the air-borne material has reached the drum, equilibrium is established. The servomotors are in coincidence and there is no current output from the servomotor circuit and therefore relay A is de-energized, relay H becomes de-energized, and pulses can no longer be passed to the counter. As a result relay K becomes energized (61, through A1, B1 and G3), the contacts K1 are immediately opened, and in the very short interval between the energizing of K and the opening of the contacts K1 an impulse is passed to the printer, which records the net weight.

The full drum is then removed, relay A is energized by the current from the servomotor circuit, which is now out of balance, and K is de-energized while all the other relays are not affected. The contacts 74 are opened as the pointer nears the zero and the magnetic clutch is de-energized allowing the pointer to be returned to a true zero by means of the spring. The opening of contacts 74 causes relay E to become de-energized. As the servomotor follower reaches the 3 lb. mark, switch 76 is closed and relay B becomes energized thus opening the printer circuit (change of B1). When the platform comes to rest, relay A becomes de-energized thereby energizing relay D (through A1 and B1), and the energizing of relay D causes D2 to open and thereby de-energize relays F and G. The apparatus is now ready to perform a second automatic net weighing.

Table I sets out the sequence of steps which take place during a weighing operation using a weighing machine controlled by the circuit illustrated in Figure 4. For purposes of simplification the working of relay C is not included in the table. The purpose of relay C is to keep the servomotor circuit open until the liner has been adjusted and the weighing machine is in equilibrium. During this stage the relays are as shown in stage 1 of Table I, relay C also being in. When the liner has been adjusted, switch 75 is closed momentarily, relay C drops out, the servomotor circuit is closed and the relays are then as shown in stage 2 of Table I. Relay C does not come in again until stage 11 of Table I is reached.

The weight determining means and the visual weight indicating means may be controlled by a time switch whose operation is started by an initial movement of the weighing platform and which brings the weight determining means and the visual indicating means into operation, only when equilibrium must have been reached in the weighing equipment.

It will be appreciated that the visual indicating means need not be used since the true net weight is recorded by the counting unit. The pointer which indicates the tare and gross weights may be dispensed with if only the indication of the net weight is required. The arrangement illustrated in Figures 1, 2, 3 and 4 has the advantage that the desired net weight is always determined irrespective of whether or not the weighing platform is fully up when the weighing equipment is in equilibrium in the unloaded position. That is to say, even if the platform is dirty during weighing, the desired net weight will be weighed out.

The impulses fed to the counter may be generated by methods other than that hereinbefore described. For example, instead of alternate transparent and opaque areas of a disc interrupting the passage of a beam of light on to a photoelectric cell, a cylinder 220 (Figure 13a) may be used, the cylinder having alternate transparent and opaque portions 221 and 222 (Figure 13b) circumferentially disposed and having a light source 223 and a photoelectric cell 224 arranged so that the beam may be

TABLE I

*Sequence of operations of weighing mechanism illustrated in Figure 4*

| Stage No. | Weighing machine state | Servomotor System | Switches | | Relays | | | | | | | | Result |
|---|---|---|---|---|---|---|---|---|---|---|---|---|---|
| | | | 76 | 74 | A | B | D | E | F | G | H | K | |
| 1 | Platform empty | Coincidence at zero. | Closed | Open | Out | In | In | Out | Out | Out | Out | Out | White light on. No feed. |
| 2 | Drum on platform. | Out of coincidence. Follower past 3 lb. mark. | Open | do | In | Out | In | Out | Out | Out | Out | Out | D remains in because A1 is a make-before break. |
| 3 | do | Coincidence at tare. | do | do | Out | Out | Out | In | Out | Out | In | Out | Coarse feed starts. Red light on. Magnetic clutch in. Impulses fed to counter. |
| 4 | Pointer passes 1 lb. mark. | Out of coincidence. | do | Closed | In | Out | Out | In | Out | Out | In | Out | Magnetic clutch now held in by 74. |
| 5 | Coarse feed trip reached. | do | do | do | In | Out | Out | In | In | Out | In | Out | Coarse feed changes to fine. Amber light on. |
| 6 | Fine feed trip reached. | do | do | do | In | Out | Out | In | In | In | In | Out | Feed ceases, amber light off. Impluses still passed to counter. |
| 7 | All material fed to drum. | Coincidence at gross. | do | do | Out | Out | Out | In | In | In | Out | In | Impulses to counter cut off. Impulse given to printer. Green light on. |
| 8 | Full drum removed. | Out of coincidence. | do | do | In | Out | Out | In | In | In | Out | Out | Green light off. Pointer still clutched. |
| 9 | Clutched pointer falls back to 1 lb. mark. | do | do | Open | In | Out | Out | Out | In | In | Out | Out | Pointer spring returned to zero. |
| 10 | Follower reaches 3 lb. mark. | do | Closed | do | In | In | Out | Out | In | In | Out | Out | Printer circuit opened. |
| 11 | Platform at rest empty. | Coincidence at or near zero. | do | do | Out | In | In | Out | Out | Out | Out | Out | White light on. Printer circuit still open. | interrupted. The impulses may also be generated by the relative movements of a magnetic field and a conductor, e.g. a magnetic tape having alternate magnetised and unmagnetised portions 190 and 192 (Figures 11a and 11b) may be made to move near a conductor 194, the movement of the magnetic tape being controlled by the action of the weighing equipment so that the number of impulses generated is a measure of the weight which causes the tape to move. The tape may be mounted for example on to the periphery of a disc 192 carried by shaft 193. The impulses may be generated by a circuit which is opened and closed in a regular manner, e.g. by means of an armature illustrated in Figures 12a and 12b, the current being fed to segments 200 on the armature by means of the brush 201 and the circuit being closed by a brush 202 which brushes the segments, and opened when the brush contacts non-conducting portions between the segments.

Instead of using an electric counter comprising counting relays it may be preferred to use an electronic counter. In electronic counters advantage is taken of the unique arrangement of the two stable states (or three if a ternary system is used) of the electronic system, corresponding to a particular number of electric impulses fed into the counter. The unique arrangement corresponding to a particular number of impulses (and in turn to a particular weight) may be controlled electronically to provide a conducting path which in turn may be used to control the automatic feeder. Electric counters may be made to operate at 50 to 100 impulses per second. Electronic counters may be made to operate at the rate of 100,000 impulses per second and may be used therefore to provide a much more rapid method of feed.

In using electric counting units it may be found convenient to connect a second relay in parallel to each counting relay the sole purpose of the second relays being to provide contacts for the net feed circuits.

The embodiment hereinbefore described comprises a means for generating electric impulses and indicating means which are operated remotely from the weighing platform. It will be appreciated that the means which generates the electric impulses may be actuated directly by the movement of the weighing platform. For example, the rotating disc which interrupts the passage of a beam of light to the photoelectric cell may be connected directly to the spindle of a weighing machine as hereinbefore described and illustrated in Figure 14. The advantage of such a remote indication is that existing weighing equipment can be provided with a means for bringing the weight determining means into operation and for controlling further operations of the automatic feeder with a minimum amount of modification to the existing equipment. A further advantage is that the minimum amount of mechanical work is put on the first machine and that the mechanism around the weighing platform is more easily constructed to prevent the intrusion of dust, and the net weight indicating scale can be placed where dust intrusion is not likely to occur to any great degree. In the embodiment hereinbefore described, the weighing platform may be part of a conventional weighing machine having a weight indicating scale.

In using weighing equipment according to our invention it is important when material is being fed into a container that there should be no hunting at the equilibrium position since the counter will count all the impulses fed into it. Hunting may be prevented either by giving the weighing equipment a dead beat response by known methods, or by controlling the feeder so that the rate of feed as it approaches the point at which it is cut off, is so reduced that the rotating disc which generates the electric impulses stops at the equilibrium position without overshooting it. A combination of these methods may be used if desired.

In the embodiment hereinbefore described, equilibrium was detected by a means which was an electric relay associated with the servomotor circuit, equilibrium in the weighing equipment corresponding to no current in the servomotor circuit. Equilibrium in the weighing equipment may be detected by other methods, e.g. electronic, magnetic, hydraulic and pneumatic methods. In an electronic method there may be an electronic means which may be made conducting when electric impulses are fed into the detecting means and this electronic means may then be made to operate a relay. It may be desirable as the rate of feed of the impulses slows down as the weighing equipment nears equilibrium to ensure that the electronic means remains conducting, and this may be done by known methods, e.g. by the use of suitable condensers. Equilibrium may be detected magnetically by holding a magnet in a balanced position near a conducting part which is preferably non-magnetic, of the weighing equipment, so that as the part moves it causes a slight deflection of the magnet, and this deflection may be used to open or close an electric circuit. In a hydraulic method, a moving part of the weighing equipment may be made to exert a slight drag on a liquid from its normally stable position and in so doing to move a contact to make or break an electric circuit. In a pneumatic method, the expansion or compression of a gas by movement of the weighing equipment when it is not in equilibrium may be communicated to a member which moves accordingly and so causes a contact to move which opens or closes an electric circuit, the member moving back to its mean position when the weighing equipment is in equilibrium and the gas is at atmospheric pressure.

Figures 5, 6, 7 and 8 illustrate diagrammatically examples of such other methods which may be used to control mechanisms for adjusting a weight determining means, or for bringing a weight determining means into operation.

Figure 5 illustrates a circuit for an electronic method of detecting equilibrium in the weighing equipment. The circuit is fed by electric impulses which may be generated as hereinbefore described, e.g. by an armature or by a photoelectric cell or by the movement of a magnetic tape. The circuit illustrated comprises valves, condensers, relays, resistances and a rectifier all represented conventionally. The valve 90 is a power or voltage amplifying valve, e.g. a valve of the type known as 6L6. The valve 91 is a voltage amplifier, e.g. a medium impedance triode valve of the type known as L63 or 6J5 or 6C5. The relay 92 is a high speed relay which operates the contacts 93 the upper contact being connected to a 110 volt supply of direct current and the lower contact being connected to the counter through appropriate contacts. The source of current 95 is a positive high tension direct current supply and the voltage will depend upon the valves used, e.g. with a valve of the type known as 6L6 at 90 the high tension supply would be 400 volts. The electric impulses from the weighing machine are fed in at 96. The valve 90 amplifies these impulses and passes them on to the high speed relay 92 which by making and breaking the contacts 93, makes electric impulses available to the counter. While valve 90 passes on impulses the valve 91 conducts and energises the relay 94. When valve 90 stops passing on impulses, i.e. when the weighing machine is in equilibrium the valve 91 ceases to conduct and relay 94 is de-energised. Depending upon the capacities of the condensers and the values of the resistances R1 and R2, the valve 91 can be made to stop conducting immediately or only after an interval of time, e.g. up to several seconds. We have found, for example, that when using valves of the type known as 6L6 and L63, or 6J5 or 6C5, a delay of from 1 to 2 seconds before valve 91 ceases to conduct may be obtained when the condensers C1 and C2 have capacities 0.05 and 1.0 microfarad respectively, and the resistances R1 and R2 are 680,000 ohms and 2 megohms respectively. Such a delay may be desirable where it is important that all the impulses should be counted before the relay 94 is de-energised. If a steady current flows into valve 90, this may happen for example if the impulses are provided by a rotating disc interrupting light to a photoelectric cell and at equilibrium the disc should come to rest with a transparent portion between the beam of light and the photoelectric cell, relay 91 will still drop out since there is no transfer of charge across the condenser unless there is a changing potential.

The circuit illustrated in Figure 5 may be used for example in combination with that illustrated in Figure 4 by replacing relay A (Figure 4) by relay 94 (Figure 5), and by connecting the lower contact of 93 (Figure 5) to the lower contact of H3 (Figure 4). The rest of the circuit of Figure 4 remains the same. In this arrangement the servomotor circuit is not used for determining equilibrium in the weighing equipment. The servomotor system may be dispensed with entirely by mounting the disc which generates the electric impulses on the weighing machine spindle and by dispensing with the remote visual indication of the net weight.

Figure 6 illustrates a method of detecting equilibrium using a magnet. In the diagram which shows a front and a side elevation of the arrangement, 100 represents part of a disc which rotates when the weighing machine is not in equilibrium. Below the lower edge of the disc is a magnet 101 supported by knife edges 102 resting on the supports 103, the knife edges being above the centre of gravity of the magnet. The shape and position of the magnet are such that the edge of the disc passes midway between the poles of the magnet. The magnet has attached to it a thin wire 104 which carries a mask 105 which has a slit in it. The mask 105 may be made of any lightweight, opaque, rigid material, e.g. metal foil. In the equilibrium position the mask 105 is arranged to lie between two other masks 106 which also have slits, so that a beam of light from the source 108 passes through the collimating system 107, through the slits on to the photoelectric cell 109. The disc 100 is preferably made from a nonferrous metal, e.g. aluminium, to eliminate any attraction of the disc to either pole of the magnet. When the disc rotates it will cause the magnet to move slightly in the direction of rotation; the magnet will therefore swing slightly on its knife edge and the slit 105 will move out of alignment with the slits in the masks 106. The photoelectric cell 109 will then cease to give a current. Therefore when the weighing machine is not in equilibrium the photoelectric cell does not give a current, and when the weighing machine is in equilibrium the photoelectric cell gives a current. This current when amplified can be made to operate relays which control mechanisms for adjusting the weight determining means, or for bringing the weight determining means into operation. For example, this method may be used to control relay A of Figure 4 instead of using the output from the servomotor system. Since equilibrium corresponds to a flow of current from the photoelectric cell it is necessary in this case to modify the contact A1 so that A1 is in the position shown when A is energised. Before the disc comes to rest at equilibrium it might oscillate to a certain extent about the equilibrium position, depending upon the speed with which it approaches that position; e.g. when operating a fine feed the disc will normally come to a stop without oscillating. However, if as the magnet returns to its equilibrium position it oscillates, it will cause the photoelectric cell to pass on an interrupted current before the current becomes steady. This may be prevented from having any disadvantageous effect by incorporating in the circuit a time delay of known kind, e.g. a condenser across the relay coil which delays the build up of voltage across the relay coil, so that the photoelectric cell must be illuminated for a definite time before the relay operates.

Figure 7:
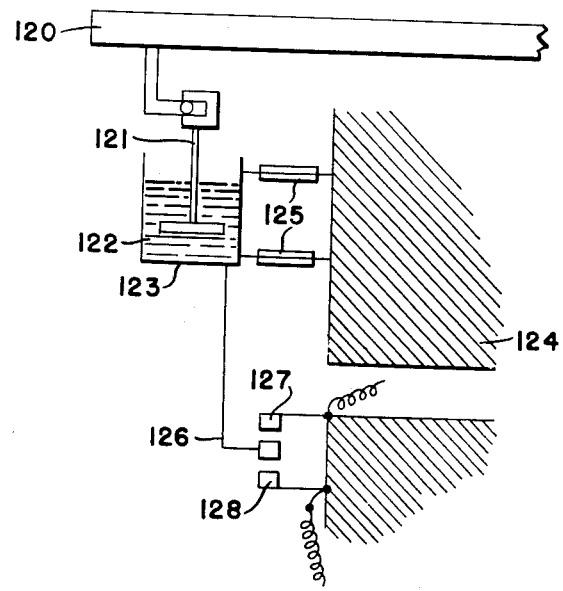

Figure 7 illustrates a hydraulic method by which equilibrium in the weighing equipment may be detected. In the diagram 120 is the tare beam of a weighing machine having a piston 121 suspended from it so that as the tare beam moves up or down the piston follows its movement. The end of the piston is beneath the level of the liquid 122 in the container 123. The container is attached to a support 124 by latch spring hinges 125. At the bottom of container 123 there is connected the contact 126. On either side of contact 126 are two other contacts 127 and 128. When the tare beam moves up the container tends to be carried up by the piston, and while the tare beam is moving up the contact 126 touches contact 127 thus causing current to flow through an appropriate circuit. Similarly, when the tare beam is moving down contact 126 touches contact 128 and closes a circuit which may be the same as or different to the circuit closed by contacts 126 and 127. When the tare beam comes to rest at equilibrium the flow of liquid in the container allows the container to return to its normal position with contact 126 not touching either 127 or 128. Therefore, when the tare beam moves, current flows; when the tare beam is at rest no current flows. The circuit may be modified by the incorporation of one or more condensers to ensure that either no current flows or that only a steady current flows, so that when the tare beam comes to rest or starts to move the consequence is that either a steady current ceases to flow or that a steady current starts to flow.

Figure 8:
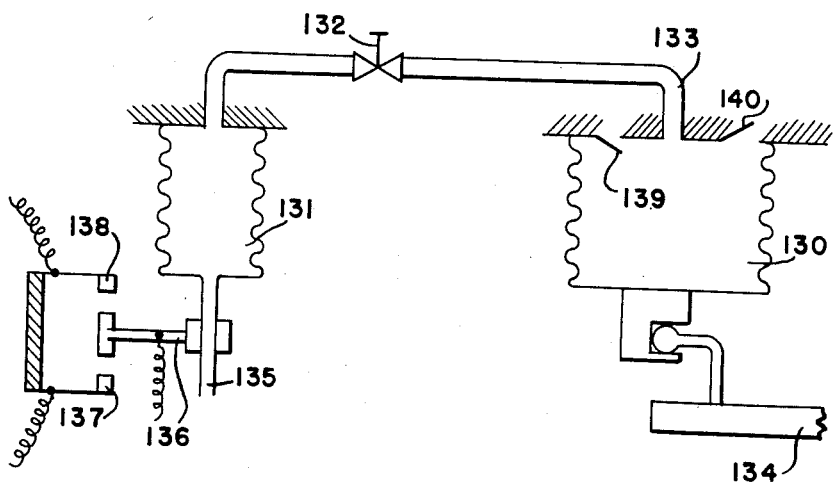

Figure 8 illustrates a method by which equilibrium in the weighing equipment may be detected by a pneumatic method. In the diagram, 130 is a rateless bellows, i.e. a bellows which has no stiffness, e.g. a bellows made of fabric or limp film material. The bellows 131 is a medium rated bellows, i.e. a bellows which may be compressed or expanded but when the pressure is released tends to return to a particular position. Such a bellows may be made of metal. The bellows 130 is attached to the tare beam 134 of a weighing machine and it is connected by means of a tube 133 to the bellows 131. The tube has a valve 132 which restricts the passage of air from one bellows to the other to any desired extent. Bellows 130 is provided with valves 139 and 140 which allow air to be rapidly drawn in from or allowed to escape to the atmosphere so that the movement of the tare beam is not hindered by the compression or expansion of bellows 130. Bellows 131 has a nozzle 135 which is open to the atmosphere and also carries a contact 136 which lies between two other contacts 137 and 138. When the tare beam moves up the bellows 130 is compressed and some of the compressed air passes into the bellows 131 causing it to expand. The nozzle 135 moves downward and contact 136 touches contact 137. When the tare beam moves down air is drawn from bellows 131 into bellows 130. When the tare beam comes to rest the bellows 131 tends to return to its mean position and to allow this, air is either drawn into or escapes from the nozzle, depending upon whether bellows 131 is expanded or compressed. Thus, when the tare beam is at rest and the bellows 131 has returned to its mean position the contact 136 is separated from either contacts 137 and 138. By adjusting the valve 132 and the size of the nozzle 135, the bellows 131 may be allowed to return to its mean position only after a certain time after the tare beam has come to rest, and thus allow the contacts to be broken only after the weighing machine is in static equilibrium. The contacts may form part of a circuit which controls further operation of the weighing machine, and use may be made of this method to distinguish between equilibrium in the weighing machine after being loaded, and equilibrium after being unloaded.

The type of automatic feeding means which is made to operate when the container has been tared and equilibrium established in the weighing equipment will depend upon the kind of material which is being weighed and will be appropriate to the nature of that material. When our invention is used for feeding desired amounts of powders, granules, lumps, pellets or pastes, a vibratory feeder of known type may be used and we prefer that it should be hydraulically operated since this type of feeder has a sharp cut-off, is relatively quiet in operation, can operate at variable amplitudes and frequencies and can be used for widely differing sizes of solid materials. Our weighing equipment may also be used for weighing out desired amounts of liquids and gases into containers. Liquids may be fed into tared containers by means of a compressed inert gas, the feed being automatically controlled preferably by solenoid operated normally spring closed valves. Gases under pressure can be similarly weighed out into containers.

Our equipment may be used to provide a printed record of the net, tare and gross weights together with, if desired, a visual indication of these weights. In the embodiment hereinbefore described this is achieved by the provision of a scale which carries two pointers, one which moves continuously and shows the tare and gross weights and the other which moves only during net weighing. The electric impulses are only passed on to the counter and it is not possible therefore, in this embodiment to provide a printed record of the tare and gross weights. By modifying the weighing equipment hereinbefore described and illustrated in Figures 1, 2, 3 and 4, additional counters may be used which provide this additional information. The general layout is similar to that illustrated in Figures 1 and 2 and a servomotor system is used similar to that illustrated in Figure 3. The circuit which is used to detect equilibrium and bring the weight measuring means into operation and to control the operation of the feeder is illustrated in Figure 9. The device for returning the net weight indicating pointer to zero is similar to that illustrated in Figure 2 except that the spring 38 is connected to earth and the contact 39 is connected to the magnetic clutch circuit. Three counters are used, one to indicate tare weight, one to indicate net weight and one to indicate gross weight. In operation, when a container is placed on the platform the gross counter operates continuously. The pointer 29 also moves to give a visual indication of the tare weight. At equilibrium the fast feed begins, the tare counter ceases to operate, and the net counter begins to operate. As the appropriate circuits are made in the net counter the fast feed changes to a slow feed and finally the feed stops. When the system is at equilibrium the counters indicate the gross, tare and net weights and the printing mechanism operates to take a printed record. The counters are automatically re-set to zero after the printer has operated. The circuit of the magnetic clutch which operates pointer 28 is arranged to open as hereinbefore described, when the pointer is near the zero on its return, e.g. at approximately the one pound mark on the scale, and the pointer is returned to zero by a spring which pushes the pointer back against a fixed stop.

In Figure 9, 150 is a rectifier having its input terminals connected to the output terminals of the amplifier of the servomotor system, and its output terminals connected to the relay L. L, M, N, P, Q, R and S are relays which control the groups of contacts L1, L2; M1, M2; N1, N2, N3, N4, N5; P1, P2; Q1, Q2; R1, R2, R3; and S1, S2, S3. The relays are shown in the de-energised condition. The two way switch 151 and the single switch 152 are ganged together and are operated by movement of the weighing platform, the contacts being in the position shown when the platform is not loaded, and the moving contacts being in the down position when a container is fully on the platform. The contacts shown at 153 and 154 represent the circuits which are made in the net counter when the appropriate number of impulses has been fed in to effect the change from fast to slow feed and to stop the operation of the feeder. Terminal 155 is connected to a white indicator lamp, terminals 156 and 157 are connected to the automatic feed device, terminal 156 controlling the coarse feed, and terminal 157 controlling the fine feed. The fast feed circuit has in parallel a red indicating lamp and the slow feed circuit has in parallel an amber indicating lamp. Terminal 158 is connected to the printing unit. The printing unit circuit has in parallel a green indicating lamp. Terminals 159, 160 and 161 are connected to the tare, net and gross counters respectively. The magnetic clutch which operates pointer 128 is shown at 162. Terminal 163 is connected to a 230 volt supply of alternating current. The terminal 164 is connected to contact 39 shown in Figure 2 and provides a hold-on contact for the relay P so that once this relay has been energised and the magnetic clutch circuit closed, the circuit remains closed until the pointer returns nearly to zero and the roller drops into the notch in the disc attached to the pointer. The terminals marked + are each connected to a 24 volt supply of direct current. The source of electric impulses is connected to the lower terminal of contact S2.

Where a liner is used the servomotor circuit is kept open and the ganged switch, in this case manually operated, kept in the up position until the liner is adjusted. The servomotor circuit is then closed, followed by movement of the ganged switch to the down position. Taring and weighing out then proceed automatically. At the end of weighing the ganged switch is moved up and the servomotor circuit opened when the pointer has returned to zero.

The circuit operates as follows. When the platform is empty relay L is not energized because the servomotors are in static coincidence and there is no current from the servomotor circuit; L1 and L2 are in the positions shown. Relay M is not energized because switch 151 is in the up position; M2 closes the circuit from the positive source of current through 151 to relay N, which is therefore energized. All the contacts of relay N are in the down position, the white lamp 155 is on, and the gross and tare counters are connected through N4 to the upper contact of S2. N5 is open and provides a break in the circuit to relay P, which is therefore not energized. P2 is open and the magnetic clutch that operates the weighing machine net pointer is not energized. Since N2 is open, Q and R cannot be energized. S is energized through the closed contacts R3; therefore, the moving contact of S1 is in the lower position. S2 is closed so that any pulses fed in will be counted by the tare and gross counters 159 and 161 through N4, and S3 is closed.

When an empty drum is first placed on the platform, the switches 151 and 152 remain in the up position, and the servomotors move out of coincidence giving an output current that energizes relay L. Pulses are fed in through S2 and counted by the tare and gross counters. With the drum fully on, switches 151 and 152 move to the down position. Relay L remains in, and switch 151 brings in relay M. Relay N, which was kept in by switch 151 when it was in the up position, is now held in by L1 and N1.

At tare equilibrium relay L drops out, and by opening the contacts L1 causes relay N to drop out. Contacts N5 close, and the circuit for relay P through N5 and S3 (S remains in) to earth, is closed, and P is therefore energized. The energizing of relay P causes P2 to close and energize the magnetic clutch 162 for the net pointer. The de-energization of relay N causes N4 to change and open the circuit from the pulse input point S2 to the tare counter 159, and at the same time make the circuit from the pulse input to the net counter. The changing of the moving contact of N3 to the lower position causes the white light to go off, and the 230 volt A.C. supply to be fed to the automatic feeder to give a coarse feed 156 (163 through N3, Q2 to 156). The remaining relays Q, R and S are not changed.

With the start of the feed, the servomotor circuit is out of balance and relay L is energized. As the net pointer passes the 1 lb. mark, the roller causes the contacts to be closed and thereby earth 164 and thus provide a hold-on for relay P. At the first predetermined weight the required number of pulses fed into the net counter cause the counter to provide a closed circuit that closes the open circuit represented by 153, and thus energize relay Q (positive D.C. supply, through N2 and Q to earth by 153). This causes contacts Q1 to be closed and provide a hold-on for relay Q (as feeding continues the circuit 153 opens) and at the same time the moving contact of Q2 to move down and cause the 230 volt A.C. supply to be fed to the fine feeder (163, N3, Q2, R2, 157).

When the second predetermined weight is reached, the required number of pulses fed into the net counter cause the counter to provide a closed circuit that closes the open circuit represented by 154 and energize relay R (positive supply, N2, R, 154). Contacts R1 are closed and provide a hold-on for relay R. The moving contact of R2 moves down and prepares the printer circuit (230 volt A.C. supply, N3, Q2, R2, 152) as far as contacts L2, which are held open by energized relay L. Although contacts R3 are now open, relay S remains energized by the hold-on effected by S1 (moving contact down) N1 and L1 to the positive D.C. supply. As airborne material collects in the drum, more pulses are fed into the net counter and circuit 154 is therefore opened; but relay R remains energized by the hold-on R1 to N2.

When all the material has been collected and the platform has come to rest, the servomotors are in static equilibrium and therefore relay L is de-energized. This causes L1 to open and break the hold-on for relay S thus opening contacts S2 and preventing any further pulses being fed to the counters. At the same time L2 is closed thus closing the circuit to the printer, and the net weight is recorded by the printer.

The drum is removed, relay L becomes energized, and the net pointer returned towards zero. As the pointer passes the 1 lb. mark the roller mechanism operates and de-energizes relay P which in turn causes the magnetic clutch to be de-energized; the pointer is returned to zero by the spring. When the platform comes to rest in the unloaded condition, switches 151 and 152 are in the up position. Relays L and M are de-energized. Relay N is energized by the closing of the circuit by 151 (up) and M2; this opens N2, changes N3 to cause the 230 volt supply to be fed to the white light, changes N4 so that any pulses fed to the upper contact of S2 will be fed to the tare and gross counters, and opens N5. The opening of N2 deenergizes relays Q and R. Relay S is energized by the closing of R3; S2 is therefore closed and provides a path for pulses to the tare and gross counters; S3 is also closed but relay P remains de-energized because contacts N5 are open.

The apparatus is now in a condition to perform a second automatic weighing.

Table II sets out the sequence of events which take place during a weighing operation using weighing equipment controlled by the circuit illustrated in Figure 9.

Our weighing equipment may also be used in combination with a visual indicating means which is adjusted by a mechanism which may be actuated by movement of an article carrying unit when a container is carried by it. Such a means may comprise a fixed scale, a movable scale and a pointer. During taring the movable scale and the pointer both move so that the zero of the movable scale remains opposite the pointer. At equilibrium further movement of the movable scale is prevented and when the desired net weight has been fed, the net weight is indicated by the pointer on the movable scale, the gross weight by the pointer on the fixed scale, and the tare weight is shown by the position of the zero of the movable scale on the fixed scale. The movable scale may be driven by a servomotor system as hereinbefore described, or it may be driven by a magnetic clutch or by a Wheatstone bridge mechanism as hereinafter described. Alternatively a time switch mechanism may be used which is arranged to prevent further adjustment of the visual indicating means when equilibrium must have been reached and which then allows the automatic feed mechanism to begin. When the filled container is removed from the platform the pointer returns to zero and the movable scale can be made to return by electrical means or it can be made to return to zero by means of a lightly loaded spring.

Figure 10 illustrates a Wheatstone bridge system

TABLE II

*Sequence of operations of weighing mechanism illustrated in Figure 9*

| Stage No. | Weighing machine state | Servomotor System | Platform switch | Magnetic clutch operating pointer | Relays | | | | | | | Resulting Actions |
|---|---|---|---|---|---|---|---|---|---|---|---|---|
| | | | | | L | M | N | P | Q | R | S | |
| 1 | Platform empty | Coincidence at zero | Up | Out | Out | Out | In | Out | Out | Out | In | White light on. No feed. Gross and tare counter circuits closed. |
| 2 | Drum partly on platform. | Out of coincidence | Up | Out | In | Out | In | Out | Out | Out | In | Gross and tare weights being counted. |
| 3 | Drum fully on platform. | do | Down | Out | In | In | In | Out | Out | Out | In | Relay N held only by L1. |
| 4 | Tare weight registered. | Coincidence at tare | Down | In | Out | In | Out | In | Out | Out | In | Coarse feed starts. Magnetic clutch in. Red light on. Net counter in. Tare counter out. |
| 5 | Pointer passes 1 lb. mark. | Out of coincidence | Down | In | In | In | Out | In | Out | Out | In | Roller rides on periphery of disc and makes hold-on contact for relay P. |
| 6 | Coarse feed trip touched. | do | Down | In | In | In | Out | In | In | Out | In | Coarse feed changes to fine. Amber light on. |
| 7 | Fine feed trip touched. | do | Down | In | In | In | Out | In | In | In | In | Feed ceases, amber light off. Gross and net counters held in. |
| 8 | At equilibrium with full gross weight. | Coincidence at gross weight. | Down | In | Out | In | Out | In | In | In | Out | Gross and net counters out. Printer operates. Green light on. |
| 9 | Full drum removed. | Out of coincidence | Up | In | In | In | Out | In | In | In | Out | Green light off. Pointer still held by magnetic clutch. |
| 10 | Clutched pointer falls back to 1 lb. mark. | do | Up | Out | In | In | In | Out | In | In | Out | Pointer spring returned from 1 lb. mark to zero. |
| 11 | Platform at rest empty. | Coincidence at zero | Up | Out | Out | Out | In | Out | Out | Out | In | Printer circuit not made at coincidence because 152 is open. White light on. | which may be used to adjust or drive the weight measuring mechanism. The Wheatstone bridge comprises the four resistances 181, 182, 183 and 184 and current is fed into the circuit from the source of alternating current 185. The Wheatstone bridge is connected to the input side of the amplifier 186 as shown, and an electric driving motor 187 is connected to output side of the amplifier. The amplifier is connected to a source of current shown at 188. The resistances 181 and 182 are both variable and 182 is mechanically connected to the rotor of the driving motor so that when resistance 181 is altered, current flows through the circuit which is amplified and fed into the motor. The motor then operates to alter the value of 182 until balance is restored and current ceases to flow through the circuit. Use of this method may be made in a visual weight indicating means comprising a pointer, a fixed scale and a movable scale by making the pointer move over and in contact with a resistance wire, the resistance 181 of Figure 10 being equivalent to the length of resistance wire between the pointer and the fixed zero of the scale. The movable scale is also made to move over and in contact with a resistance wire, the resistance 182 of Figure 10 being equivalent to the length of resistance wire between the point of contact between the moving scale and the resistance wire, and the zero of the fixed scale. The driving motor is connected to the movable scale. Any displacement of the pointer causes current to flow in the circuit which in turn causes the motor to turn the movable scale until balance is restored, that is, when the zero of the movable scale is opposite the pointer. The movable scale may thus be made to follow any movement of the pointer. The mechanism may be made frictionless by the use of a capacity bridge. It will be appreciated that the Wheatstone bridge, may also be used in combination with an electric relay as a means for detecting equilibrium and putting a weight measuring means into operating condition.

When our invention is used for filling containers from bunkers or hoppers with an automatic outlet feed and the containers have liners, we prefer that there should be a switch for starting or stopping the automatic operation of our equipment in order that the liner may be adjusted to the feeding device without the weighing mechanism being upset. Thus, there may be a switch which is operated when the liner has been suitably arranged, and causes the sequence of weighing equipment adjustment for the weight of the container, starting and stopping the feed of the material, together with if desired, tare, net and gross weighing, and followed, if desired, by the removal of the filled container from the platform and its labelling, and the placing of a new container on the platform. The switch may be automatically controlled so that at any suitable stage of the weighing sequence the switch is operated to open the circuit which controls the automatic operation of the equipment and the circuit is only closed by manual operation of the switch. Such a method of switching is illustrated in Figure 4 (relay C and switch 75) and also in Figure 9.

We claim:

1. Weighing mechanism comprising in combination an article carrying member operable in response to change of load carried thereby, means operatively connected with said member for generating electric pulses in accordance with change of load carried by said member, an electrical pulse operated counter adapted to be operatively connected with said pulse generating means and operable from a zero position when so connected to measure increase of load carried by said member, means operatively connected with said member for detecting cessation of operation of said member following a change of load carried by said member, means operatively connected with said pulse generating means and operable in response to a detection of cessation by said detecting means to operatively connect said counter with said pulse generating means and to feed pulses generated in accordance with subsequent increase of load carried by said member to said counter, means for feeding material to said member, and electrical means operatively connected with said counter and operable in response to a unique condition of signals in said counter corresponding to a predetermined weight to stop said feeder.

2. Weighing mechanism as defined in claim 1, including means operatively connected with said counter and operative to adjust the counter to zero position when load is removed from said article carrying member.

3. Weighing mechanism as defined in claim 1, wherein said means for detecting cessation of operation of said member comprises a servomotor circuit and a relay operative when current ceases to flow in said circuit.

4. Weighing mechanism as defined in claim 1, wherein said means for detecting cessation of operation of said member comprises means responsive to pulses generated by said generating means for controlling a current through an electronic conductor, and a relay operative when the flow of current in said electronic conductor changes.

5. Weighing mechanism as defined in claim 1, wherein said means for detecting cessation of operation of said member comprises a metallic part movable in accordance with change of load supported by said member, a magnet normally balanced adjacent said metallic part in such manner as to be temporarily unbalanced by relative movement of said metallic part, and means for effecting an electrical circuit when said magnet is balanced.

6. Weighing mechanism as defined in claim 1, wherein said means for detecting cessation of operation of said member comprises a non-ferrous metallic disc movable in accordance with change of load carried by said member, a magnet normally balanced adjacent said metallic part in such manner as to be temporarily unbalanced by relative movement of said metallic part, and means for affecting an electrical circuit when said magnet is balanced.

7. Weighing mechanism as defined in claim 1, wherein said means for detecting cessation of operation of said member comprises a plunger and a liquid-containing container, said plunger extending into the liquid in said container, one of said liquid connected elements being movable in accordance with change of load carried by said member and the other of said liquid connected elements being normally balanced in such manner as to be unbalanced by relative movement of the movable element, and means for affecting an electrical circuit when said normally balanced element is balanced.

8. Weighing mechanism as defined in claim 1, wherein said means for detecting cessation of operation of said member comprises a bellows and means for varying the internal pressure of said bellows in accordance with change of load carried by said member, and means for affecting an electrical circuit when said bellows is in normal equilibrium position.

9. Weighing mechanism as defined in claim 1, wherein said means operative in response to a detection of cessation to feed pulses to said counter includes a magnetic clutch.

10. Weighing mechanism as defined in claim 1, including electrical means operatively connected with said counter and operable in response to a unique condition of signals in said counter corresponding to a weight less than said predetermined weight to slow said feeder.

11. Weighing mechanism as defined in claim 1, wherein said counter is an electric counter including a plurality of relays, and said electrical means includes a circuit which is closed when all of said relays are in unique position corresponding to a predetermined weight, said relays forming part of the closed circuit.

12. Weighing mechanism as defined in claim 1, wherein said counter is an electronic counter which controls a circuit forming part of said electrical means.

13. Weighing mechanism for measuring net weights comprising in combination an article carrying member operable in response to change of load carried thereby, means operatively connected with said member for generating electric pulses in accordance with increase of load carried by said member, an electrical pulse operated counter adapted to be operatively connected with said pulse generating means and operable from a zero position when so connected to measure increase of load carried by said member, means operatively connected with said member for detecting cessation of operation of said member following an increase of load carried by said member, means operatively connected with said pulse generating means and operable in response to a detection of cessation by said detecting means to operatively connect said counter with said pulse generating means and to feed pulses generated in accordance with subsequent increase of load carried by said member to said counter, means for feeding material to said member, means operatively connected with said pulse generating means and operable in response to a detection of cessation by said detecting means to start said feeder, and electrical means operatively connected with said counter and operable in response to a unique condition of signals in said counter corresponding to a predetermined weight to stop said feeder.

References Cited in the file of this patent

UNITED STATES PATENTS

| | | |
|---|---|---|
| 1,402,934 | Hoepner | Jan. 10, 1922 |
| 1,923,745 | Platzer | Aug. 22, 1933 |
| 2,022,659 | Fisher | Dec. 3, 1935 |
| 2,067,743 | Weckerly | Jan. 12, 1937 |
| 2,085,345 | Tuttle et al. | June 29, 1937 |
| 2,131,683 | Basquin | Sept. 27, 1938 |
| 2,132,237 | Haegele | Oct. 4, 1938 |
| 2,167,517 | Korber | July 25, 1939 |
| 2,169,465 | Hadley | Aug. 15, 1939 |
| 2,323,023 | Flanagan | June 29, 1943 |
| 2,336,130 | Saxe | Dec. 7, 1943 |
| 2,343,000 | Carliss | Feb. 29, 1944 |
| 2,394,593 | Christmann | Feb. 12, 1946 |
| 2,516,456 | Fischer | July 25, 1950 |
| 2,577,820 | Singleton | Dec. 11, 1951 |
| 2,610,052 | MacGeorge | Sept. 9, 1952 |
| 2,614,786 | Caron | Oct. 21, 1952 |
| 2,678,206 | Muldoon et al. | May 11, 1954 |
| 2,680,012 | Bozoian | June 1, 1954 |
| 2,688,459 | Merrill et al. | Sept. 7, 1954 |